US011079296B2

(12) United States Patent
Xiong et al.

(10) Patent No.: US 11,079,296 B2
(45) Date of Patent: Aug. 3, 2021

(54) PRESSURE-SENSITIVE CHIP, PRESSURE SENSOR, AND PRESSURE MONITORING SYSTEM

(71) Applicant: NORTH UNIVERSITY OF CHINA, Shanxi (CN)

(72) Inventors: Jijun Xiong, Shanxi (CN); Chen Li, Shanxi (CN); Yingping Hong, Shanxi (CN); Boshan Sun, Shanxi (CN)

(73) Assignee: NORTH UNIVERSITY OF CHINA, Taiyuan (CN)

( * ) Notice: Subject to any disclaimer, the term of this patent is extended or adjusted under 35 U.S.C. 154(b) by 84 days.

(21) Appl. No.: 16/751,306

(22) Filed: Jan. 24, 2020

(65) Prior Publication Data
US 2021/0018390 A1 Jan. 21, 2021

(30) Foreign Application Priority Data

Jun. 17, 2019 (CN) .......................... 201910521336.5
Aug. 6, 2019 (CN) .......................... 201910721320.9

(51) Int. Cl.
*G01L 9/00* (2006.01)
*G01L 19/00* (2006.01)

(52) U.S. Cl.
CPC ........ *G01L 9/0075* (2013.01); *G01L 19/0092* (2013.01); *G01L 19/0061* (2013.01)

(58) Field of Classification Search
None
See application file for complete search history.

(56) References Cited

U.S. PATENT DOCUMENTS

| 10,943,734 | B2* | 3/2021 | Teraoka | H01G 4/1245 |
|---|---|---|---|---|
| 2016/0049254 | A1* | 2/2016 | Sugita | H01G 4/228 |
| | | | | 361/301.4 |
| 2017/0008988 | A1* | 1/2017 | Kusudou | C08F 8/28 |
| 2017/0271083 | A1* | 9/2017 | Makino | H01G 4/12 |
| 2018/0044244 | A1* | 2/2018 | Sugimoto | B32B 18/00 |
| 2018/0072627 | A1* | 3/2018 | Kato | H05K 3/4688 |
| 2018/0326613 | A1* | 11/2018 | Enatsu | C04B 35/63416 |

* cited by examiner

*Primary Examiner* — Andre J Allen
*Assistant Examiner* — Jermaine L Jenkins
(74) *Attorney, Agent, or Firm* — Avant Law Group, LLC

(57) ABSTRACT

A pressure-sensitive chip, a pressure sensor, and a pressure monitoring system. In an embodiment, a pressure-sensitive chip and a signal processing module are packaged to form a pressure sensor. The pressure sensor and a display instrument are connected to form a pressure monitoring system. A pressure-sensitive chip is a ceramic body made of eight green ceramic sheets by stacking and sintering, and includes two capacitors. In another embodiment, a pressure signal of a measurement area is obtained by a method including the following steps: sensing a pressure in a measurement area by the pressure-sensitive chip; generating a capacitance signal by the pressure-sensitive chip; converting the capacitance signal to a voltage signal by the signal processing module; and converting the voltage signal into the pressure signal by the display instrument.

20 Claims, 11 Drawing Sheets

PRESSURE-SENSITIVE CHIP, PRESSURE SENSOR, AND PRESSURE MONITORING SYSTEM

CROSS REFERENCE TO RELATED APPLICATIONS

This application claims priority to Chinese Patent Application Number 201910521336.5, filed on Jun. 17, 2019 and Chinese Patent Application No. 201910721320.9, filed on Aug. 6, 2019, the disclosure of which are incorporated by reference herein in their entireties.

FIELD OF THE DISCLOSURE

The disclosure relates generally to the field of pressure sensing and monitoring. More specifically, the disclosure relates to a pressure-sensitive chip, a pressure sensor, and a pressure monitoring system.

BACKGROUND

In recent years, with rapid development in various fields, sensors are required to be miniaturized, energy-efficient, and resistant to harsh environments. For example, a pressure sensor is required to have a high measurement accuracy and sensitivity in a high-temperature environment in order to apply to a high-temperature harsh environment.

In prior high-temperature pressure sensors such as ceramic pressure sensors, a single-capacitor pressure sensor is usually used to directly measure a pressure. Ceramic has good temperature resistance, therefore can be used in a high-temperature harsh environment. However, there are some deficiencies in such single-capacitor pressure sensors. For example, single-capacitor pressure sensors are easily affected by high temperature in a high-temperature environment, which may lead to a large shift such that a pressure is difficult to be measured accurately. In addition, signal generated by a single-capacitor pressure sensor is easily affected in a high-temperature environment, which may cause signal distortion in the transmitting process.

SUMMARY

The following presents a simplified summary of the invention to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a pressure-sensitive chip. The pressure-sensitive chip includes a first green ceramic sheet having a vent hole; a second green ceramic sheet having a first-type through hole; a third green ceramic sheet having a first-type through hole; a fourth green ceramic sheet having a first-type through hole and a second-type through hole; a fifth green ceramic sheet having a first-type through hole and a second-type through hole; a sixth green ceramic sheet having a first-type through hole, a second-type through hole, and a third-type through hole; a seventh green ceramic sheet having a first-type through hole, a second-type through hole, and a third-type through hole; and an eighth green ceramic sheet having a first-type through hole, a second-type through hole, and a third-type through hole.

A first capacitive plate is provided on a bottom surface of the first green ceramic sheet. A first cavity matching the first capacitive plate is provided on a top surface of the second green ceramic sheet. A second capacitive plate is provided on a bottom surface of the third green ceramic sheet. A second cavity matching the second capacitive plate is provided on a top surface of the fourth green ceramic sheet. A third capacitive plate is provided on a bottom surface of the fifth green ceramic sheet. A third cavity matching the third capacitive plate is provided on a top surface of the sixth green ceramic sheet. The first green ceramic sheet, the second green ceramic sheet, the third green ceramic sheet, the fourth green ceramic sheet, the fifth green ceramic sheet, the sixth green ceramic sheet, the seventh green ceramic sheet, and the eighth green ceramic sheet are sequentially stacked to form a laminated body.

The first-type through hole of the second green ceramic sheet, the first-type through hole of the third green ceramic sheet, the first-type through hole of the fourth green ceramic sheet, the first-type through hole of the fifth green ceramic sheet, the first-type through hole of the sixth green ceramic sheet, the first-type through hole of the seventh green ceramic sheet, and the first-type through hole of the eighth green ceramic sheet are aligned with each other and filled with a conductive paste. The second-type through hole of the fourth green ceramic sheet, the second-type through hole of the fifth green ceramic sheet, the second-type through hole of the sixth green ceramic sheet, the second-type through hole of the seventh green ceramic sheet, and the second-type through hole of the eighth green ceramic sheet are aligned with each other and filled with the conductive paste. The third-type through hole of the sixth green ceramic sheet, the third-type through hole of the seventh green ceramic sheet, and the third-type through hole of the eighth green ceramic sheet are aligned with each other and filled with the conductive paste. The laminated body is sintered to form a ceramic body in which the first cavity communicates with the outside through the vent hole, and the second cavity and the third cavity are sealed.

Optionally, the first green ceramic sheet further includes a second-type through hole, the second green ceramic sheet further includes a second-type through hole, and the third green ceramic sheet further includes a second-type through hole. In the laminated body, the second cavity communicates with the outside through the second-type through hole of the first green ceramic sheet, the second-type through hole of the second green ceramic sheet, and the second-type through hole of the third green ceramic sheet. In the ceramic body, the second-type through hole of the first green ceramic sheet is sealed to keep the second cavity airtight.

Optionally, the first green ceramic sheet further includes a third-type through hole, the second green ceramic sheet further includes a third-type through hole, the third green ceramic sheet further includes a third-type through hole, the fourth green ceramic sheet further includes a third-type through hole, and the fifth green ceramic sheet further includes a third-type through hole. In the laminated body, the third cavity communicates with the outside through the third-type through hole of the first green ceramic sheet, the third-type through hole of the second green ceramic sheet, the third-type through hole of the third green ceramic sheet, the third-type through hole of the fourth green ceramic sheet, and the third-type through hole of the fifth green ceramic sheet. In the ceramic body, the third-type through hole of the first green ceramic sheet is sealed to keep the third cavity airtight.

Optionally, the conductive paste is a Platinum (Pt) paste.

Optionally, the second cavity and the third cavity are separately supported with a carbon film.

Optionally, the seventh green ceramic sheet is the same as the eighth green ceramic sheet.

Optionally, the first capacitive plate, the second capacitive plate, and the third capacitive plate are separately formed by screen printing the conductive paste.

Optionally, a pressure signal is obtained by detecting a first capacitance between the first capacitive plate and the second capacitive and a second capacitance between the second capacitive plate and the third capacitive plate.

Optionally, the pressure-sensitive chip is hexagonal.

Optionally, a first welding spot connected to the first capacitive plate, a second welding spot connected to the second capacitive plate, and a third welding spot connected to the third capacitive plate are provided on a bottom surface of the ceramic body.

In other embodiments, the disclosure provides a pressure sensor. The pressure sensor includes a pressure-sensitive chip, a vent housing configured to accommodate the pressure-sensitive chip, a ceramic base provided in the vent housing and fixed to a connector, an airtight housing matching the vent housing and connected to the connector, a processing module provided in the airtight housing. The vent housing includes a vent head cover with a vent channel and the connector matching the vent head cover. The pressure-sensitive chip is mounted on the ceramic base. The processing module converts a capacitance signal generated by the pressure-sensitive chip into a differential voltage signal.

Optionally, the vent housing is kept airtight relatively to the airtight housing.

Optionally, the processing module includes a converting circuit for converting a capacitance signal generated by the pressure-sensitive chip into a differential voltage signal, an amplifying circuit for amplifying the differential voltage signal, and a thermocouple for detecting an operating temperature of the converting circuit and the amplifying circuit.

Optionally, the pressure-sensitive chip is connected to the processing module via a communication wire.

Optionally, the ceramic base includes conductors matching the first welding spot connected to the first capacitive plate, the second welding spot connected to the second capacitive plate, and the third welding spot connected to the third capacitive plate of the pressure-sensitive chip.

Optionally, the pressure-sensitive chip communicates with the outside through the vent channel.

Optionally, a ring groove is provided on a housing wall of one end of the airtight housing distal to the pressure-sensitive chip.

In further embodiments, the disclosure provides a pressure monitoring system. The pressure monitoring system includes a pressure sensor and a display instrument. The display instrument is connected to the processing module of the pressure sensor. The display instrument receives an output signal from the processing module. The display instrument displays a curve of pressure changing with time based on the output signal.

Optionally, the output signal includes a resistance signal and the differential voltage signal. The display instrument corrects the differential voltage signal based on the resistance signal.

Optionally, the display instrument displays a curve of pressure changing with time and a current pressure value on different screens, respectively.

BRIEF DESCRIPTION OF THE DRAWINGS

Illustrative embodiments of the disclosure are described in detail below with reference to the attached drawing figures.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

As used herein the term "comprising" or "comprises" is used in reference to compositions, methods, and respective component(s) thereof, that are useful to an embodiment, yet open to the inclusion of unspecified elements, whether useful or not. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.).

Unless stated otherwise, the terms "a" and "an" and "the" and similar references used in the context of describing a particular embodiment of the application (especially in the context of claims) can be construed to cover both the singular and the plural. The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (for example, "such as") provided with respect to certain embodiments herein is intended merely to better illuminate the application and does not pose a limitation on the scope of the application otherwise claimed. The abbreviation, "e.g." is derived from the Latin exempli gratia, and is used herein to indicate a non-limiting example. Thus, the abbreviation "e.g." is synonymous with the term "for example." No language in the specification should be construed as indicating any non-claimed element essential to the practice of the application.

FIGS. 1-11 show some embodiments of a pressure monitoring system. Hereinafter, the system is described in detail with reference to the accompanying drawings.

Figure 1:
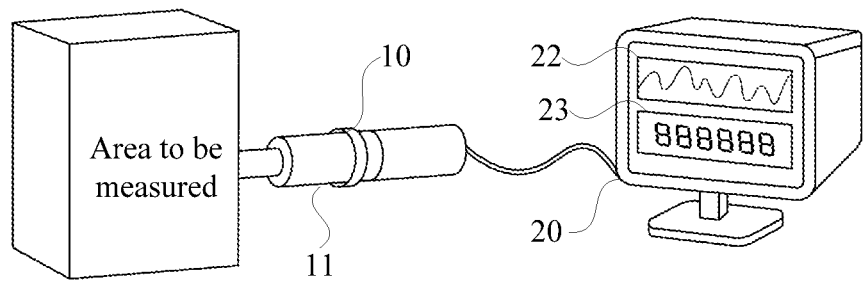
FIG. 1 is a schematic diagram illustrating a pressure monitoring system according to an embodiment of the disclosure.

FIG. 1 is a schematic diagram illustrating the pressure monitoring system 1 according to an embodiment of the disclosure. As shown in FIG. 1, a pressure monitoring system 1 may include a pressure sensor 10 and a display instrument 20. The pressure sensor 10 may measure a pressure in an area to be measured and transmit the measured signal to the display instrument 20. The display instrument 20 may process the signal from the pressure sensor 10 and display pressure information of the area to be measured.

Figure 2:
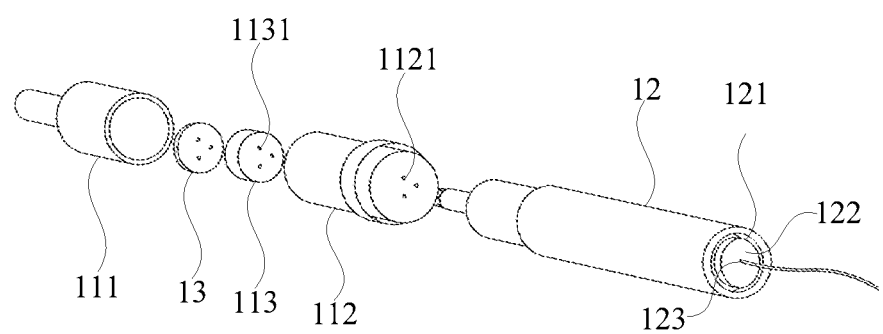
FIG. 2 is a schematic diagram illustrating a disassembled structure of a pressure sensor according to an embodiment of the disclosure.
Figure 3:
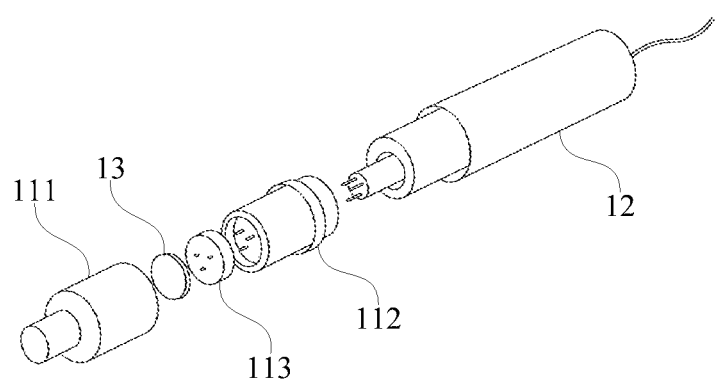
FIG. 3 is a schematic diagram illustrating a disassembled structure of a pressure sensor according to an embodiment of the disclosure.

FIG. 2 is a schematic diagram illustrating a disassembled structure of the pressure sensor 10 according to an embodiment of the disclosure. FIG. 3 is a schematic diagram illustrating a disassembled structure of the pressure sensor 10 according to an embodiment of the disclosure. The pressure sensor 10 may include a vent housing 11, an airtight housing 12, a pressure-sensitive chip 13, and a processing module 14.

In some embodiments, the vent housing 11 may include a vent head cover 111 and a connector 112 matching the vent head cover 111, and the vent housing 11 may connect to the airtight housing 12 via the connector 112. In addition, a ceramic base 113 fixed to the connector 112 may be provided in the vent housing 11, and the pressure-sensitive chip 13 may be mounted on the ceramic base 113 to be accommodated in the vent housing 11. When the vent housing 11 is in communication with an area to be measured, the air flow in the area to be measured may reach a pressure-sensitive chip 13 through the air channel of the vent head cover 111. Therefore, the pressure-sensitive chip 13 may measure a pressure in the area to be measured. A processing module 14 may be packaged in the airtight housing 12. The processing module 14 may receive a capacitance signal from the pressure-sensitive chip 13 and convert the capacitance signal into a voltage signal.

In other embodiments, the pressure-sensitive chip 13 may be positioned in the vent housing 11, and the processing module 14 used for processing a signal from the pressure-sensitive chip 13 may be positioned in the airtight housing 12. The pressure-sensitive chip 13 may communicate with the outside through the vent housing 11 and the processing module 14 may be protected by the airtight housing 12. Therefore, a capacitance signal generated by the pressure-sensitive chip 13 may be obtained and a differential voltage signal may be obtained by processing the capacitance signal in a high-temperature environment. The vent housing 11 may be made of a nickel-base high temperature alloy.

In further embodiments, a thread structure (not shown) may be provided at the front end of the vent head cover 111, which may help to ensure the pressure sensor 10 be easily in communication with an area to be measured with the thread structure. Cooling fins (not shown) may be evenly arranged on the outer wall of the vent head cover 111, which may help to ensure heat conduction of the pressure sensor 10 be effectively reduced. The vent head cover 111 may be connected to the connector 112 via the thread structure. The connecting portion of the vent head cover 111 and the connector 112 may be airtight. The vent head cover 111 and the connector 112 may be integrated by welding, which may help to maintain the consistency between the air pressure in the vent housing 11 and that in the area to be measured.

In some embodiments, the connector 112 may be made of ceramic material. The connector 112 may include a through hole 1121. The connector 112 may include two or three through holes 1121 (see FIG. 2 and FIG. 3). The through hole 1121 of the connector 112 may be used to thread a guide wire. The through holes 1121 of the connector 112 may be filled with a conductive paste to form conductors. In this way, the pressure-sensitive chip 13 in the vent housing 11 may be easily in communicating connection with the processing module 14 in the airtight housing 12. The through hole 1121 may be pin-sealed to maintain the airtightness at one end of the vent housing 11 which is closed to the connector 112 after threading a guide wire through the through hole 1121 of the connector 112.

In some embodiments, the ceramic base 113 may be made of alumina ceramic material. The ceramic base 113 may include a through hole 1131. The ceramic base 113 may include two or three through holes 1131 (see FIG. 2 and FIG. 3). The through hole 1131 of the ceramic base 113 may be used to thread a guide wire. The through holes 1131 of the ceramic base 113 may be filled with a conductive paste to form conductors. In this way, the pressure-sensitive chip 13 in the vent housing 11 may be easily in communicating connection with the processing module 14 in the airtight housing 12.

In other embodiments, insulation gel may be provided at one end of the ceramic base 113 which is closed to the connector 112. In this way, the high-temperature conduction from the vent housing 11 to the airtight housing 12 may be effectively reduced. The airtight housing 12 may be made of a nickel-base high temperature alloy. The vent housing 11 may connected to the airtight housing 12 with a thread structure. The connecting portion may be laser welded after the vent housing 11 connected to the airtight housing 12. The vent housing 11 may be kept airtight relatively to the airtight housing 12, that is, the high-temperature air in the vent housing 11 may not enter the airtight housing 12. The inside of the airtight housing 12 may be formed as an airtight room. In this way, an adverse effect on the processing module 14 (e.g. the processing circuit 21 of the processing module 14) caused by the high-temperature air entering the airtight housing 12 may be effectively prevented. Cooling fins (not shown) may be provided on an outer wall of the airtight housing 12.

In further embodiments, an insulation gel (not shown) may be provided on an inner wall of the airtight housing 12. In this way, a high-temperature conducted to the processing module 14 through the housing of the airtight housing 12 may be effectively prevented. A silica gel (not shown) may be provided between the insulation gel and the processing module 14. In this way, the high-temperature conduction to the processing module 14 may be reduced and the connection stability of the circuit elements of the processing module 14 may be effectively increased. A ring groove 121 may be provided on the housing wall of an end which is distal to the pressure-sensitive chip 13 of the airtight housing 12 (see FIG. 2). A lug boss 122 may be formed within the ring groove 121. Communicating conductor 123 for communicating with other devices such as the display instrument 20 may be disposed on the lug boss 122. In this way, a high-temperature conduction to the communicating conductor 123 may be effectively reduced.

Figure 4:
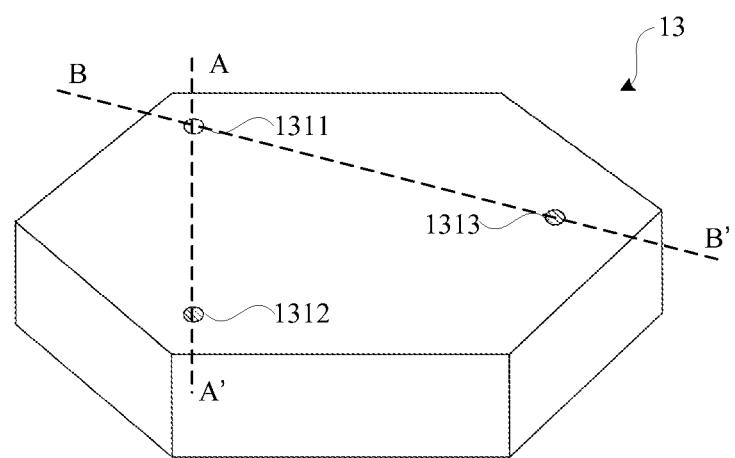
FIG. 4 is a schematic diagram illustrating a pressure-sensitive chip according to an embodiment of the disclosure.
Figure 5:
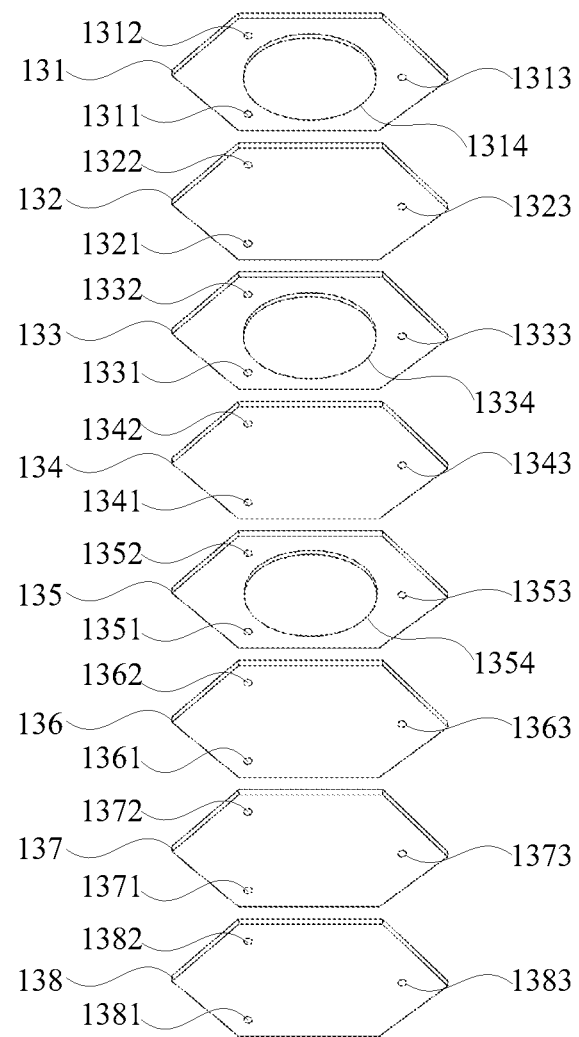
FIG. 5 is a schematic diagram illustrating a disassembled structure of a pressure-sensitive chip according to an embodiment of the disclosure.
Figure 6:
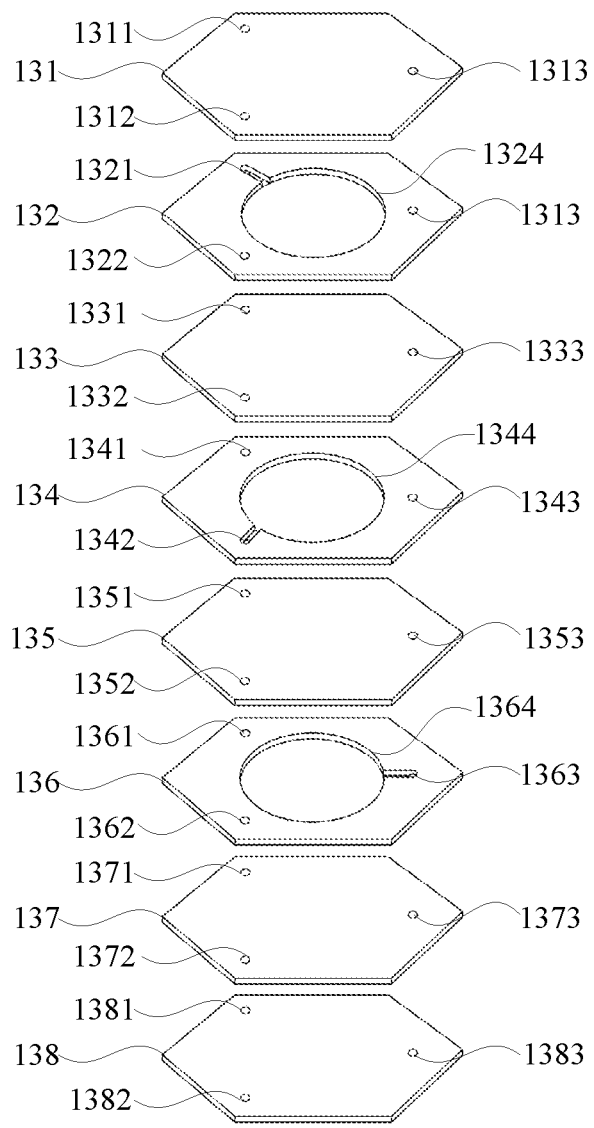
FIG. 6 is a schematic diagram illustrating a disassembled structure of a pressure-sensitive chip according to an embodiment of the disclosure.
Figure 7:
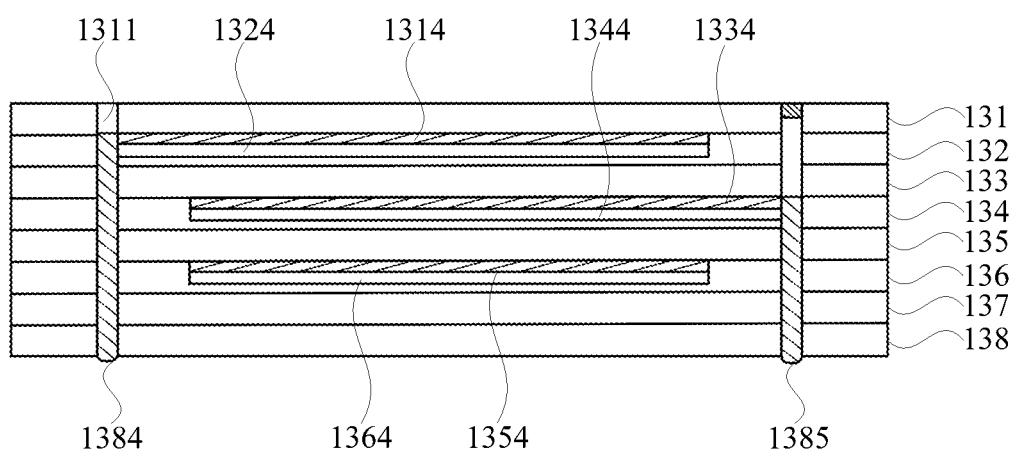
FIG. 7 illustrates the cross-section view along the dot line AA' in FIG. 4.
Figure 8:
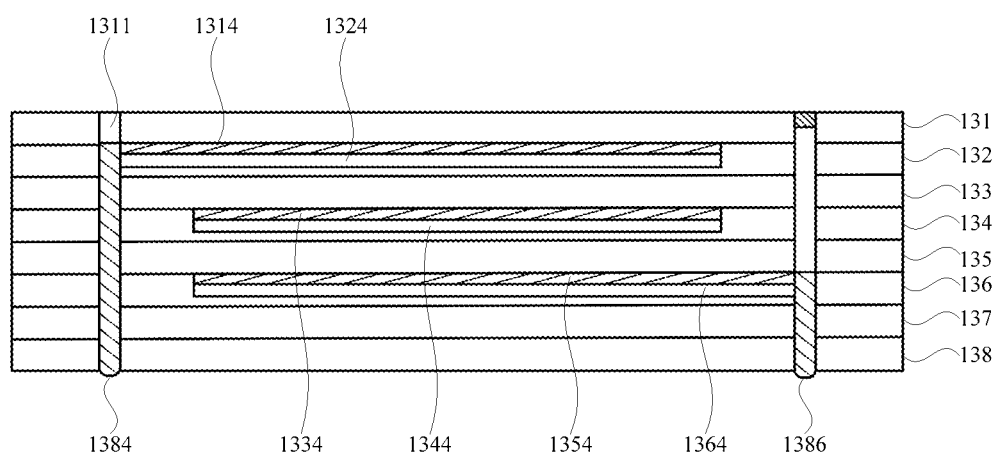
FIG. 8 illustrates the cross-section view along the dot line BB' in FIG. 4.

Hereinafter, the pressure-sensitive chip 13 is described in detail with reference to FIGS. 4-8. FIG. 4 is a schematic diagram illustrating a pressure-sensitive chip 13 according to an embodiment of the disclosure. FIG. 5 is a schematic diagram illustrating a disassembled structure of the pressure-sensitive chip 13 according to an embodiment of the disclosure. FIG. 6 is a schematic diagram illustrating a disassembled structure of the pressure-sensitive chip 13 according to an embodiment of the disclosure. FIG. 7 illustrates the cross-section view along the dot line AA' of the pressure-sensitive chip 13 in FIG. 4. FIG. 8 illustrates the cross-section view along the dot line BB' of the pressure-sensitive chip 13 in FIG. 4.

In some embodiments, the pressure-sensitive chip 13 is a whole that may be made of a first green ceramic sheet 131, a second green ceramic sheet 132, a third green ceramic sheet 133, a fourth green ceramic sheet 134, a fifth green ceramic sheet 135, a sixth green ceramic sheet 136, a seventh green ceramic sheet 137, and an eighth green ceramic sheet 138. The pressure-sensitive chip 13 may be manufactured by sequential stacking and sintering (see FIG. 4). The pressure-sensitive chip 13 may be used to measure a pressure in an area. For example, the pressure-sensitive chip 13 may measure a pressure in the area to be measured by sensing the air in the area to be measured, and a capacitance signal may be used to indicate the pressure.

In other embodiments, the first green ceramic sheet 131 may include a vent hole 1311, and a first capacitive plate 1314 may be provided on a bottom surface of the first green ceramic sheet 131. The second green ceramic sheet 132 may include a first-type through hole 1321, and a first cavity 1324 matching the first capacitive plate 1314 may be provided on a top surface of the second green ceramic sheet 132. The third green ceramic sheet 133 may include a first-type through hole 1331, and a second capacitive plate 1334 may be provided on a bottom surface of the third green ceramic sheet 133. The fourth green ceramic sheet 134 may include a first-type through hole 1341 and a second-type through hole 1342, and a second cavity 1344 matching the second capacitive plate 1334 may be provided on a top surface of the fourth green ceramic sheet 134. The fifth green ceramic sheet 135 may include a first-type through hole 1351 and a second-type through hole 1352, and a third capacitive plate 1354 may be provided on a bottom surface of the fifth ceramic sheet 135. The sixth ceramic sheet 136 may include a first-type through hole 1361, a second-type through hole 1362, and a third-type through hole 1363, and a third cavity 1364 matching the third capacitive plate 1354 may be provided on a top surface of the sixth green ceramic sheet 136. The seventh green ceramic sheet 137 may include a first-type through hole 1371, a second-type through hole 1372, and a third-type through hole 1373. The eighth green ceramic sheet 138 may include a first-type through hole 1381, a second-type through, hole 1382, and a third-type through hole 1383 (see FIG. 5 and FIG. 6).

In further embodiments, the first green ceramic sheet 131, the second green ceramic sheet 132, the third green ceramic sheet 133, the fourth green ceramic sheet 134, the fifth green ceramic sheet 135, the sixth green ceramic sheet 136, the seventh green ceramic sheet 137 and the eighth green ceramic sheet 138 may be sequentially stacked to form a laminated body. In the laminated body, the first-type through hole 1321 of the second green ceramic sheet 132, the first-type through hole 1331 of the third green ceramic sheet 133, the first-type through hole 1341 of the fourth green ceramic sheet 134, the first-type through hole 1351 of the fifth green ceramic sheet 135, the first-type through hole 1361 of the sixth green ceramic sheet 136, the first-type through hole 1371 of the seventh green ceramic sheet 137, and the first-type through hole 1381 of the eighth green ceramic sheet 138 may be aligned with each other and filled with a conductive paste. The second-type through hole 1342 of the fourth green ceramic sheet 134, the second-type through hole 1352 of the fifth green ceramic sheet 135, the second-type through hole 1362 of the sixth green ceramic sheet 136, the second-type through hole 1372 of the seventh green ceramic sheet 137, and the second-type through hole 1382 of the eighth green ceramic sheet 138 may be aligned with each other and filled with the conductive paste. The third-type through hole 1363 of the sixth green ceramic sheet 136, the third-type through hole 1373 of the seventh green ceramic sheet 137 and the third-type through hole 1383 of the eighth green ceramic sheet 138 may be aligned with each other and filled with the conductive paste. The laminated body may be sintered to form a whole, that is, a ceramic body. In the ceramic body, the first cavity 1324 may communicate with the outside through the vent hole 1311 of the first green ceramic sheet 131, and the second cavity 1344, and the third cavity 1364 may be sealed.

In some embodiments, a ceramic body having three capacitive plates may be formed by stacking each green ceramic sheet (e.g. eight green ceramic sheets). The first cavity 1324 of the ceramic body may communicate with the outside. The second cavity 1344 and the third cavity 1364 may be sealed to be airtight, forming one fixed capacitor and two variable capacitors. Compared with single-capacitor pressure-sensitive chip, the differential-capacitor pressure-sensitive chip 13 may measure a pressure more accurately. The conductive paste may be a Platinum (Pt) paste. The seventh green ceramic sheet 137 may be the same as the eighth green ceramic sheet 138. In this way, the process may be easily performed. The first capacitive plate 1314, the second capacitive plate 1334, and the third capacitive plate 1354 may be separately formed by screen printing the conductive paste. The pressure-sensitive chip 13 may be hexagonal, which may be helpful to perform alignment between the stacked green ceramic sheets in the process of making the pressure-sensitive chip 13.

In other embodiments, the first cavity 1324, the second cavity 1344, and the third cavity 1364 may be supported with a carbon film (not shown). These cavities may be separated from each other or in contact with each other. The length of the carbon film in the first cavity 1324 may be as long as the depth of the first cavity 1324. The length of the carbon film in the second cavity 1344 may be as long as the depth of the second cavity 1344. The length of the carbon film in the third cavity 1364 may be as long as the depth of the third cavity 1364. In this way, the first cavity 1324, the second cavity 1344, and the third cavity 1364 may be effectively prevented from collapsing during the sintering process.

In further embodiments, the first green ceramic sheet 131 may further include a second-type through hole 1312, the second green ceramic sheet 132 may further include a second-type through hole 1322, and the third green ceramic sheet 133 may further include a second-type through hole 1332. And in the laminated body, the second cavity 1344 may communicate with the outside through the second-type through hole 1312 of the first green ceramic sheet 131, the second-type through hole 1322 of the second green ceramic sheet 132 and the second-type through hole 1332 of the third green ceramic sheet 133. And in the ceramic body, the second-type through hole 1312 of the first green ceramic sheet 131 may be sealed to keep the second cavity 1344 airtight (see FIG. 4). That is, the second cavity 1344 may communicate with the outside during the sintering process, and the second cavity 1344 may be sealed to be airtight after the sintering process. A glass paste may be used to seal the second-type through hole 1312 of the first green ceramic sheet 131 to keep the second cavity 1344 airtight after sintering process. In this way, the third green ceramic sheet 133 and the fourth green ceramic sheet 134 may be prevented effectively from deforming due to poor ventilation in the sintering process.

In some embodiments, the first green ceramic sheet 131 may further include a third-type through hole 1313. The second green ceramic sheet 132 may further include a third-type through hole 1323. The third green ceramic sheet 133 may further include a third-type through hole 1333. The fourth green ceramic sheet 134 may further include a third-type through hole 1343. The fifth green ceramic sheet 135 may further include a third-type through hole 1353. In the laminated body, the third cavity 1364 may communicate with the outside through the third-type through hole 1313 of the first green ceramic sheet 131, the third-type through hole 1323 of the second green ceramic sheet 132, the third-type through hole 1333 of the third green ceramic sheet 133, the third-type through hole 1343 of the fourth green ceramic sheet 134, and the third-type through hole 1353 of the fifth green ceramic sheet 135. In the ceramic body, the third-type through hole 1313 of the first green ceramic sheet 131 may be sealed to keep the third cavity 1364 airtight with the outside (see FIG. 4). That is, the third cavity 1364 may communicate with the outside during the sintering process, and the third cavity 1364 may be sealed to be airtight to the outside after the sintering process. A glass paste may be used to seal the third through hole 1313 of the first green ceramic sheet 131 to keep the third cavity 1364 airtight after sintering process. In this way, the fifth green ceramic sheet 135 and the sixth green ceramic sheet 136 may be prevented effectively from deforming due to poor ventilation during the sintering process.

In other embodiments, a communicated groove may be provided between the first cavity 1324 and the first-type through hole 1321 of the second green ceramic sheet 132. In this way, the first cavity 1324 may be easily in communication with the outside. A communicated groove may be provided between the second cavity 1344 and the second-type through hole 1342 of the fourth green ceramic sheet 134. In this way, the second cavity 1344 may be easily in communication with the outside. A communicated groove may be provided between the third cavity 1364 and the third-type through hole 1363 of the sixth green ceramic sheet 136. In this way, the third cavity 1364 may be easily in communication with the outside.

In further embodiments, a pressure signal may be obtained by detecting a first capacitance between the first capacitive plate 1314 and the second capacitive plate 1334 and a second capacitance between the second capacitive plate 1334 and the third capacitive plate 1354. In this way, a pressure signal may be easily obtained. A first welding spot 1384 connected to the first capacitive plate 1314, a second welding spot 1385 connected to the second capacitive plate 1334, and a third welding spot 1386 connected to the third capacitive plate 1354 may be provided on a bottom surface of the ceramic body (i.e. a bottom surface of the eighth green ceramic sheet 138) (see FIG. 7 and FIG. 8). In this way, the pressure signal from each welding spot may be easily output via the bottom surface of the ceramic body.

In some embodiments, the pressure-sensitive chip 13 may be communicatively connected to the processing module 14 via a communicating wire (not shown). One end of the communicating wire may be connected to the first welding spot 1384, the second welding spot 1385, and the third welding spot 1386 respectively, and the other end of the communicating wire may be connected to the processing module 14 through the through hole 1131 of the ceramic base 113 and the through hole 1121 of the connector 112. The through holes 1131 of the ceramic base 113 may be filled with a conductive paste to form conductors, and the first welding spot 1384, the second welding spot 1385, and the third welding spot 1386 may be connected to each conductor respectively. In this case, the pressure-sensitive chip 13 may be communicatively connected to the processing module 14 via a conductor of the ceramic base 113 and a communicating wire which is threaded through the through hole 1121 of the connector 112.

Figure 9:
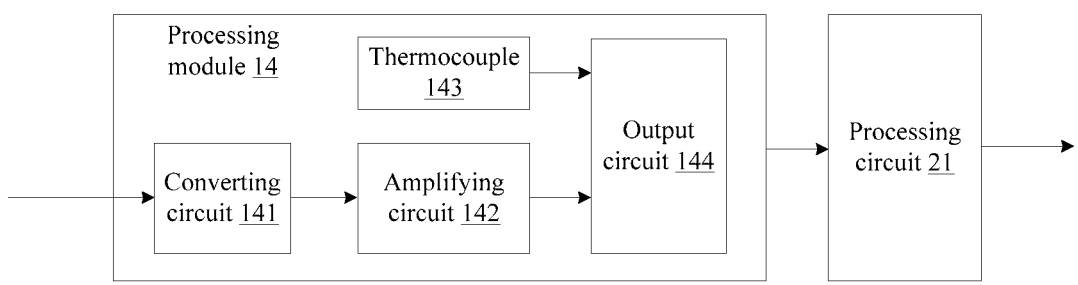
FIG. 9 is a schematic block diagram illustrating a processing module of a pressure sensor according to an embodiment of the disclosure.

FIG. 9 is a schematic block diagram illustrating the processing module 14 of the pressure sensor 10 according to an embodiment of the disclosure. As shown in FIG. 9, the processing module 14 may include a converting circuit 141, an amplifying circuit 142, a thermocouple 143, and an output circuit 144. In some embodiments, the converting circuit 141 may convert a capacitance signal generated by the pressure-sensitive chip 13 into a differential voltage signal, and transmit the differential voltage signal to the amplifying circuit 142. The amplifying circuit 142 may obtain an amplified voltage signal by amplifying the differential voltage signal. The thermocouple 143 may detect an operating temperature of the converting circuit 141 and the amplifying circuit 142 and indicate the temperature with a resistance value. The output circuit 144 may transmit the amplified voltage signal and the resistance value detected by the thermocouple 143 to the display instrument 20.

Figure 10:
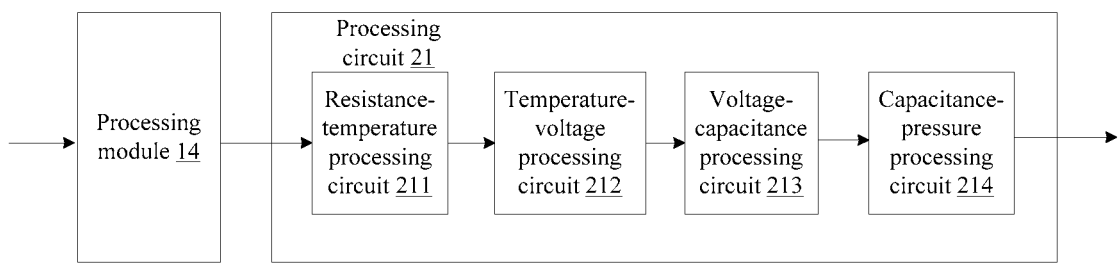
FIG. 10 is a schematic block diagram illustrating a processing circuit of a display instrument according to an embodiment of the disclosure.

FIG. 10 is a schematic block diagram illustrating a processing circuit 21 of the display instrument 20 according to an embodiment of the disclosure. As shown in FIG. 10, the processing circuit 21 of the display instrument 20 may include a resistance-temperature processing circuit 211, a temperature-voltage processing circuit 212, a voltage-capacitance processing circuit 213, and a capacitance-pressure processing circuit 214. The processing circuit 21 of the display instrument 20 may communicatively connected to the processing module 14 of the pressure sensor 10.

In some embodiments, the resistance-temperature processing circuit 211 may obtain an operating temperature of the converting circuit 141 and the amplifying circuit 142 of the processing module 14 based on the resistance value detected by the thermocouple 143. The temperature-voltage processing circuit 212 may obtain a corrected voltage by correcting the deviation of the converting circuit 141 and the amplifying circuit 142 caused by temperature change based on the operating temperature. The voltage-capacitance processing circuit 213 may obtain a capacitance signal of the pressure-sensitive chip 13 based on the corrected voltage. And the capacitance-pressure processing circuit 214 may obtain a pressure of an area to be measured based on the capacitance signal.

In other embodiments, the processing circuit 21 may be stored in a microcontroller. A relationship between the operation temperature and the voltage of the converting circuit 141 and the amplifying circuit 142 of the processing module 14 may be obtained according to simulation experiments. That is, the correspondence between the displayed voltage, the operating temperature, and the shift amount may be obtained based on several sets of simulation experiments data. The correspondence may be stored in the temperature-voltage processing circuit 212 of the processing circuit 21.

The processing circuit 21 may further store a capacitance change range of the pressure-sensitive chip 13.

In further embodiments, the display instrument 20 may include one or more screens. The display instrument 20 may include an upper screen 22 and a lower screen 23 (see FIG. 1). The upper screen 22 may display a curve of pressure changing with time, and the lower screen 23 may display a current pressure value. The lower screen 23 may display a curve of pressure changing with time, and the upper screen 22 may display a current pressure value.

Figure 11:
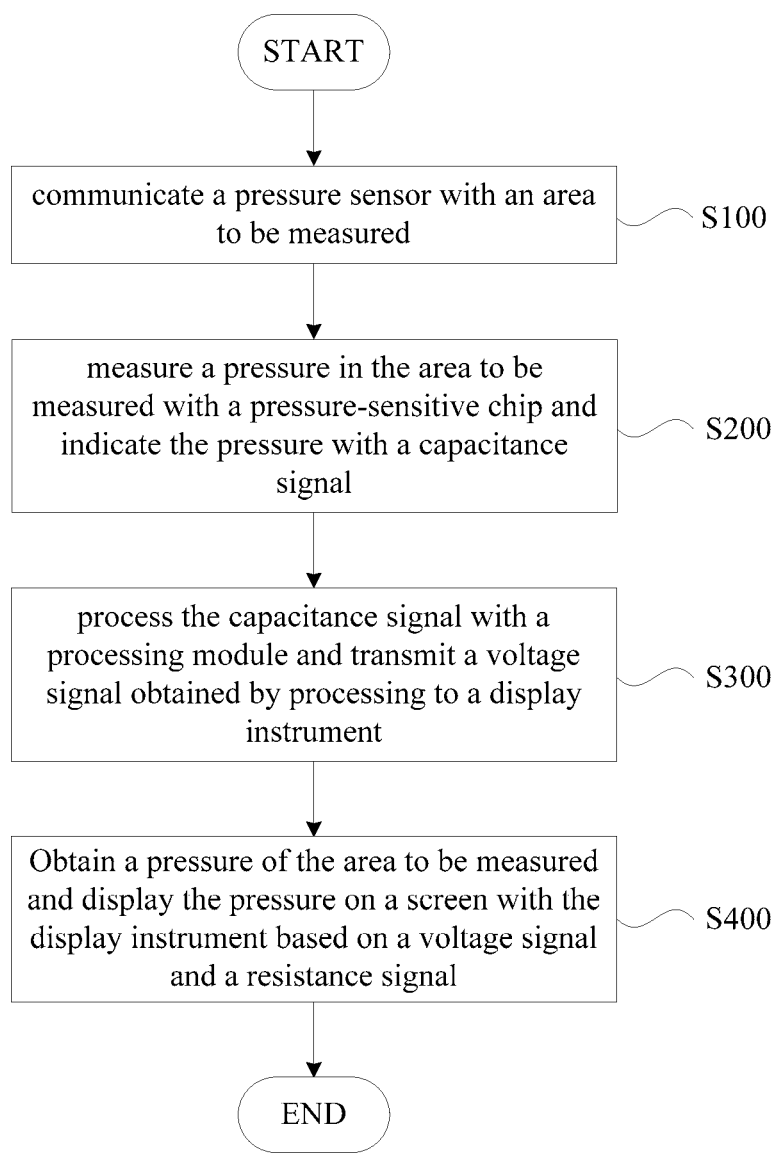
FIG. 11 is a flow diagram illustrating a pressure monitoring system measuring a pressure according to an embodiment of the disclosure.

Hereinafter, a pressure measurement performance according to an embodiment is described in detail. FIG. 11 is a schematic diagram illustrating a procedure of the pressure monitoring system 1 measuring pressure according to an embodiment of the disclosure.

First, in step S100, communicating the pressure sensor 10 with an area to be measured by the thread structure provided at the front end of the vent head cover 111 so that the air flow in the area to be measured may reach the pressure-sensitive chip 13 through the vent channel of the vent head cover 111, and then the first cavity 1324.

Next, in step S200, a pressure difference may be generated between the airtight second cavity 1344 and the first cavity 1324. As a result, the third green ceramic sheet 133 may deform and the second capacitive plate 1334 may shift. In this case, two capacitance signals may be generated since the distance between the second capacitive plate 1334 and the first capacitive plate 1314 and the distance between the second capacitive plate 1334 and the third capacitive plate 1354 are changing simultaneously. The capacitance signal may be transmitted to the processing module 14 via the first welding spot 1384, the second welding spot 1385, the third welding spot 1386, conductors of the ceramic base 113, and conductors of the connector 112.

Next, in step S300, the converting circuit 141 of the processing module 14 may convert the capacitance signal into a differential voltage signal, and the amplifying circuit 142 of the processing module 14 may amplify the differential voltage signal to obtain an amplified voltage signal. Meanwhile, the thermocouple 143 of the processing module 14 may detect an operating temperature of the converting circuit 141 and the amplifying circuit 142 in real time and indicate the operating temperature with a resistance value. The output circuit 144 of the processing module 14 may transmit the amplified voltage signal and the resistance value to the display instrument 20.

Last, in step S400, the resistance-temperature processing circuit 211 may obtain an operating temperature of the converting circuit 141 and the amplifying circuit 142 based on the resistance value obtained in step S300. The temperature-voltage processing circuit 212 may correct the amplified voltage signal obtained in step S300 based on the operating temperature to obtain a corrected voltage with the temperature effect eliminated. The voltage-capacitance processing circuit 213 may obtain a capacitance signal of the pressure-sensitive chip 13 based on the corrected voltage. The capacitance-pressure processing circuit 214 may obtain the pressure value of the area to be measured based on the capacitance signal. The display instrument 20 may display a curve of pressure changing with time on an upper screen 22 and display a current pressure value on a lower screen 23.

Some embodiments of the disclosure may have one or more of the following effects. The disclosure may provide a pressure-sensitive chip, a pressure sensor and a pressure monitoring system. The pressure-sensitive chip, the pressure sensor and the pressure monitoring system as described herein may have a high measurement accuracy and may be used in a high-temperature environment. A Platinum conductive material may be used to provide a good conductive effect. The first capacitive plate, the second capacitive plate, and the third capacitive plate may be separately formed by screen printing a conductive paste, which may help to form high quality capacitive plates.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A pressure-sensitive chip, comprising:
   a first green ceramic sheet having a vent hole, wherein a first capacitive plate is provided on a bottom surface of the first green ceramic sheet;
   a second green ceramic sheet having a first-type through hole, wherein a first cavity matching the first capacitive plate is provided on a top surface of the second green ceramic sheet;
   a third green ceramic sheet having a first-type through hole, wherein a second capacitive plate is provided on a bottom surface of the third green ceramic sheet;
   a fourth green ceramic sheet having a first-type through hole and a second-type through hole, wherein a second cavity matching the second capacitive plate is provided on a top surface of the fourth green ceramic sheet;
   a fifth green ceramic sheet having a first-type through hole and a second-type through hole, wherein a third capacitive plate is provided on a bottom surface of the fifth green ceramic sheet;
   a sixth green ceramic sheet having a first-type through hole, a second-type through hole, and a third-type through hole, wherein a third cavity matching the third capacitive plate is provided on a top surface of the sixth green ceramic sheet;
   a seventh green ceramic sheet having a first-type through hole, a second-type through hole, and a third-type through hole; and
   an eighth green ceramic sheet having a first-type through hole, a second-type through hole, and a third-type through hole;
   wherein:
   the first green ceramic sheet, the second green ceramic sheet, the third green ceramic sheet, the fourth green ceramic sheet, the fifth green ceramic sheet, the sixth green ceramic sheet, the seventh green ceramic sheet, and the eighth green ceramic sheet are sequentially stacked to form a laminated body;
   the first-type through hole of the second green ceramic sheet, the first-type through hole of the third green ceramic sheet, the first-type through hole of the fourth green ceramic sheet, the first-type through hole of the fifth green ceramic sheet, the first-type through hole of the sixth green ceramic sheet, the first-type through hole of the seventh green ceramic sheet, and the first-type through hole of the eighth green ceramic sheet are aligned with each other and filled with a conductive paste;

the second-type through hole of the fourth green ceramic sheet, the second-type through hole of the fifth green ceramic sheet, the second-type through hole of the sixth green ceramic sheet, the second-type through hole of the seventh green ceramic sheet, and the second-type through hole of the eighth green ceramic sheet are aligned with each other and filled with the conductive paste;

the third-type through hole of the sixth green ceramic sheet, the third-type through hole of the seventh green ceramic sheet, and the third-type through hole of the eighth green ceramic sheet are aligned with each other and filled with the conductive paste; and the laminated body is sintered to form a ceramic body in which the first cavity communicates with the outside through the vent hole, and the second cavity and the third cavity are sealed.

2. The pressure-sensitive chip of claim 1, wherein:

the first green ceramic sheet further comprises a second-type through hole, the second green ceramic sheet further comprises a second-type through hole, and the third green ceramic sheet further comprises a second-type through hole;

in the laminated body, the second cavity communicates with the outside through the second-type through hole of the first green ceramic sheet, the second-type through hole of the second green ceramic sheet, and the second-type through hole of the third green ceramic sheet; and in the ceramic body, the second-type through hole of the first green ceramic sheet is sealed to keep the second cavity airtight.

3. The pressure-sensitive chip of claim 2, wherein:

the first green ceramic sheet further comprises a third-type through hole, the second green ceramic sheet further comprises a third-type through hole, the third green ceramic sheet further comprises a third-type through hole, the fourth green ceramic sheet further comprises a third-type through hole, and the fifth green ceramic sheet further comprises a third-type through hole;

in the laminated body, the third cavity communicates with the outside through the third-type through hole of the first green ceramic sheet, the third-type through hole of the second green ceramic sheet, the third-type through hole of the third green ceramic sheet, the third-type through hole of the fourth green ceramic sheet, and the third-type through hole of the fifth green ceramic sheet; and in the ceramic body, the third-type through hole of the first green ceramic sheet is sealed to keep the third cavity airtight.

4. The pressure-sensitive chip of claim 1, wherein the conductive paste is a Pt paste.

5. The pressure-sensitive chip of claim 1, wherein the second cavity and the third cavity are separately supported with a carbon film.

6. The pressure-sensitive chip of claim 1, wherein the seventh green ceramic sheet is the same as the eighth green ceramic sheet.

7. The pressure-sensitive chip of claim 1, wherein the first capacitive plate, the second capacitive plate, and the third capacitive plate are separately formed by screen printing the conductive paste.

8. The pressure-sensitive chip of claim 1, wherein a pressure signal is obtained by detecting a first capacitance between the first capacitive plate and the second capacitive plate and a second capacitance between the second capacitive plate and the third capacitive plate.

9. The pressure-sensitive chip of claim 1, wherein the pressure-sensitive chip is hexagonal.

10. The pressure-sensitive chip of claim 1, wherein a first welding spot connected to the first capacitive plate, a second welding spot connected to the second capacitive plate, and a third welding spot connected to the third capacitive plate are provided on a bottom surface of the ceramic body.

11. A pressure sensor, comprising:

a pressure-sensitive chip in claim 1;

a vent housing configured to accommodate the pressure-sensitive chip;

a ceramic base provided in the vent housing and fixed to a connector;

an airtight housing matching the vent housing and connected to the connector; and a processing module provided in the airtight housing;

wherein:

the vent housing comprises a vent head cover with a vent channel and the connector matching the vent head cover;

the pressure-sensitive chip is mounted on the ceramic base; and the processing module converts a capacitance signal generated by the pressure-sensitive chip into a differential voltage signal.

12. The pressure sensor of claim 11, wherein the vent housing is kept airtight.

13. The pressure sensor of claim 11, wherein:

the processing module comprises a converting circuit, an amplifying circuit, and a thermocouple;

the converting circuit converts a capacitance signal generated by the pressure-sensitive chip into a differential voltage signal;

the amplifying circuit amplifies the differential voltage signal; and the thermocouple detects an operating temperature of the converting circuit and the amplifying circuit.

14. The pressure sensor of claim 11, wherein the pressure-sensitive chip is connected to the processing module via a communication wire.

15. The pressure sensor of claim 11, wherein the ceramic base comprises conductors matching a first welding spot connected to the first capacitive plate, a second welding spot connected to the second capacitive plate, and a third welding spot connected to the third capacitive plate of the pressure-sensitive chip.

16. The pressure sensor of claim 11, wherein the pressure-sensitive chip communicates with the outside through the vent channel.

17. The pressure sensor of claim 11, wherein a ring groove is provided on a housing wall of one end of the airtight housing distal to the pressure-sensitive chip.

18. A pressure monitoring system comprising a pressure sensor in claim 11 and a display instrument, wherein:

the display instrument is connected to the processing module of the pressure sensor;

the display instrument receives an output signal from the processing module; and the display instrument displays a curve of pressure changing with time based on the output signal.

19. The pressure monitoring system of claim 18, wherein:
the output signal comprises a resistance signal and the differential voltage signal; and
the display instrument corrects the differential voltage signal based on the resistance signal.

20. The pressure monitoring system of claim 18, wherein the display instrument displays a curve of pressure changing with time and a current pressure value on different screens, respectively.

* * * * *